(12) United States Patent
Meek

(10) Patent No.: US 6,304,655 B1
(45) Date of Patent: Oct. 16, 2001

(54) SIGNAL CAPTURE FOR TELECOMMUNICATIONS SWITCH

(75) Inventor: Quentin James Meek, Gloucester (CA)

(73) Assignee: Nortel Network Limited, Montreal (CA)

(*) Notice: Subject to any disclaimer, the term of this patent is extended or adjusted under 35 U.S.C. 154(b) by 0 days.

(21) Appl. No.: 09/218,052

(22) Filed: Dec. 22, 1998

(51) Int. Cl.[7] .................................................. H04M 1/00
(52) U.S. Cl. .................... 379/406.01; 714/37; 714/32; 710/32
(58) Field of Search ............................... 379/34, 35, 406, 379/407, 410, 411; 714/37, 32; 110/12

(56) References Cited

U.S. PATENT DOCUMENTS 5,450,487 * 9/1995 Lähdemäki et al. .................. 379/407
5,577,116 * 11/1996 Townsend et al. ............... 379/407 X
6,006,344 * 12/1999 Bell, Jr. .................................. 719/32

* cited by examiner

*Primary Examiner*—Creighton Smith
(74) *Attorney, Agent, or Firm*—Withrow & Terranova, P.L.L.C.

(57) ABSTRACT

Signal capture control circuitry for use integrated in a switch for a telecommunications network, includes circuitry for selecting at least one of the call paths corresponding to a given call, for signal capture for analysis. Capture control circuitry for controlling the signal capture on the selected call path and for communicating with the call control circuitry is also provided. Having the signal capture control as part of the switch, and communicating with call control circuitry of the switch, makes it becomes possible to analyse previously inaccessible signals in the switch or in its inputs or outputs. Also, it becomes possible to trigger signal capture based on call control events which do not appear externally.

15 Claims, 6 Drawing Sheets

SIGNAL CAPTURE FOR TELECOMMUNICATIONS SWITCH

FIELD OF THE INVENTION

The invention relates to signal capture apparatus, to switches having signal capture apparatus, to methods of using such apparatus, and to corresponding software.

BACKGROUND TO THE INVENTION

If a problem with a call arises in a telecommunications switch, e.g. one of the well known DMS switches of Nortel Networks, there may be considerable difficulties in establishing where the cause of the problem lies. In principle it can be caused by external factors (e.g. incoming signals or power supplies or physical environment factors being outside their expected ranges) or internal faults. Some internal faults will cause alarms to be triggered which can help enable the cause to be identified. If no alarms are triggered, a number of diagnostic tests may be undertaken to establish the cause of the problem.

For many switches, it is impractical to recreate their working conditions accurately in a laboratory environment, since they may have hundreds or thousands of calls being passed through them, with widely varying signal characteristics on the calls. Accordingly, the diagnosis must be made in the field, or at least with the switch operating under realistic load conditions. In this case, an attempt can be made to reproduce the fault condition by initiating a call over the same path as was used when the reported call processing problem occurred. The path may be identified from call processing records.

If the fault condition is repeatable, it is then desirable to locate the cause by monitoring the signals along the signal path or paths as they pass through the switch. However, a switch may have many physical paths with perhaps many signals time multiplexed on each physical path. This may be the case both inside the switch and at any trunks connected to the switch. In this case individual calls can be monitored either by listening at either end of a call path, where the individual signals have been demultiplexed from trunks, or by carrying out demultiplexing from the trunk specially for the purpose of monitoring.

Such special demultiplexing might involve broadcasting PCM (pulse code modulated) data streams of a trunk to an external channel bank for demultiplexing. The chosen call can then be recorded on a recorder. However, particularly for higher rate trunks, demultiplex equipment would be required to select 24 channels to be routed to the channel bank. It may be relatively expensive and time consuming to move and set up manually, and only captures problems which can be repeated on a predetermined one of the call paths.

Once the call is extracted, there is the problem of triggering when to start or stop recording. Since the signal on the call path gives an indication of whether a call is on-hook or off-hook, and of keypresses made by either party to the call, these can be used for triggering. However this is often insufficient to enable problems to be identified and cause triggering, particularly if the problem occurs irregularly. If the event causing the problem cannot be used for triggering, long recordings perhaps over hours or days may be needed to ensure a particular condition or signal is captured. This may tie up data recording resources wastefully, and may cause much time to be wasted searching the recording for the event.

The signal quality can be monitored either subjectively by listening, or by making objective measurements. However, such monitoring from outside a switch may be insufficient to enable the location of a fault within the switch to be identified accurately. One reason is that noise, delay and distortion may be introduced at different points along the call path in the switch.

Attempts to monitor signal quality or find where a signal gets mis-routed or mis-timed or timed out for example in a switch or between switches, have been made using external signal or logic analysers. However in many cases it is impractical to determine which of thousands of physical paths has been selected for the call in question, and it may be impractical to get access to internal events taking place in the control software of a switch to enable the analyser capture to be triggered appropriately. In short, the speed, or complexity or size of the switch or a combination of these factors may make the signals inaccessible to external monitoring equipment.

The term "call" is intended to encompass any type of end to end connection between users of the network, including those for voice, data or fax, and including virtual connections for which a physical path may not exist at all times. It is intended also to encompass connections made as one part of longer end to end connections, e.g. a data connection to a LAN user made by a remote worker dialling in over a telephone network to a LAN remote access gateway.

It is also known to have switches arranged for electronic wire tapping, which involves distinguishing and separating a given call, and diverting a "copy" of the call through the network outside the switch to a terminal connected to external recording equipment. In this case, what is recorded will be distorted by further passage through the network, with accompanying delays, and signal processing such as digital to analog conversion. Accordingly, in this case the signal that is captured is not the signal as it was in the call processing circuitry in the switch. Furthermore, there is no mechanism for triggering capture on faults. Also the call selection will be according to the telephone number, which may leave it difficult to identify exactly which call path within a switch is being used and captured. These constraints, and regulatory constraints makes it impractical to use this mechanism for problem tracing.

It is also known to record a signal entering a speech recognition system at the same time as recognition is attempted. If recognition is not achieved, the recording is available for an operator to listen to. In this case, there is no difficulty with accessibility of the signal, or timing the recording, since the speech recognition unit will typically be external to any switch and will have a single call path and handle one call at a time.

SUMMARY OF THE INVENTION

According to a first aspect of the invention there is provided signal capture control apparatus for use integrated in a switch for a telecommunications network, the switch comprising a plurality of call paths, and call control circuitry for controlling a plurality of calls on the call paths through the switch, the apparatus comprising:

selecting circuitry for selecting at least one of the call paths corresponding to a given one of the calls, for signal capture for analysis, and capture control circuitry for controlling the signal capture on the selected call path and for communicating with the call control circuitry.

One of the advantages of providing the signal capture control as part of the switch, and communicating with the call control circuitry, is that it becomes possible to analyse previously inaccessible signals in the switch or in its inputs or outputs.

Also, it becomes possible to trigger capture based on call control events which do not appear externally. This can result in more efficient use of recording resources and can make subsequent analysis easier.

Another advantage is that signal selection and/or timing of the capture can be carried out automatically without necessarily requiring manual intervention at the switch. Thus problems can be diagnosed more quickly, and the costs involved in manual intervention to reproduce the problem and obtain captured signals at switches installed at customer premises can be reduced. The selection of call path for capture can be predetermined before capture, or can be dynamic, made in real time, as a fault is detected for example. Such selection can be made on the basis of events internal to the switch, which previously might have been inaccessible.

An advantage of being able to distinguish a signal corresponding to a particular call is that a problem specific to a given call between given endpoints is often hardest to diagnose or isolate. It is less likely to trigger an alarm that could isolate the cause. Also, switches may be connected to many outside call paths, not all of which may be performing to specification, and there may be so many that it is impractical to test them. Accordingly, it is valuable for a switch manufacturer to be able to determine whether a problem specific to a call is caused by the given call path being out of specification at a point inside the switch (manufacturer's responsibility), or external to the switch (not the manufacturer's responsibility).

Preferred features

Preferably the switch comprises signal processing circuitry for processing the signal, and the capture control circuitry is arranged to capture the signal before, after or during the signal processing. An advantage of this is that the performance of the signal processing may be heavily dependent on the exact characteristics of the signal as it is input. Hence it may be important to capture the signal at the input, to minimise or avoid the effect of any unwanted delay or other distortion in the path to the signal processor. Also, the performance of the signal processing can be verified if the signal can be captured during or after the signal processing.

Preferably the given call is multiplexed with others of the calls, and the selecting circuitry comprises circuitry for controlling demultiplexing of the given call.

Preferably the capture control circuitry comprises circuitry for generating a capture trigger signal.

One of the advantages of having at least the timing of the trigger signal being internally generated is that events or signals which only appear internally, can be used to generate the trigger. Furthermore, the accuracy of the timing can be improved by removing the uncertain delay that might occur before such events appear outside the control module, if they appear outside at all. Also, complex combinations of events can be used more easily to generate a trigger, than if the trigger were generated externally.

Preferably the capture trigger is generated on the basis of an event in the call control circuitry. This may enable triggering on the basis of internal events which can not be accessed externally. There may be an advantage in being able to trigger when the call control circuitry expects an event that does not occur in time for example. If the expected event is receipt of a DTMF tone from a caller, but the associated DTMF receiver gives no indication of receiving one within the time allowed, it could be useful to trigger signal capture. This would greatly facilitate an investigation of whether the caller in fact sent a tone which should have been detected. Also, generating the trigger internally in the switch may enable the timing to be more precise than the case where an indication of the event is sent outside the switch. There may be uncertain delays in sending indications outside the switch.

Preferably the capture trigger is generated on the basis of an event in a signal on a call path. This could enable triggering on events which appear when none are expected. If tones like DTMF keypresses are present when none are expected, or voice is present when none is expected, it would be useful to trigger signal capture. In such cases there might be no suitable trigger event in the call control circuitry, or the trigger might be generated from a combination of signal event and call control event.

Preferably the apparatus is arranged to store the captured signal in the switch.

Preferably the apparatus is arranged to send the captured signal to a remote location for analysis.

Preferably the apparatus comprises circuitry for processing the captured signal before storage. An advantage of this arrangement is that it enables the signal to be filtered or compressed if desired, e.g. to remove parts of no interest, or enable a longer portion of signal to be stored.

Preferably the apparatus is arranged to receive an indication of a fault in the telecommunications network, and to carry out the signal capture according to the fault indication.

Preferably the switch comprises signal processing circuitry and the fault indication is received from the signal processing circuitry.

Other Aspects of the Invention

Another aspect of the invention provides a method of using the above apparatus.

Another aspect of the invention provides software on a computer readable medium for carrying out the above method.

Another aspect of the invention provides a switch having the above apparatus.

Preferably the switch comprises signal processing apparatus, and circuitry for receiving results from an analysis of the captured signals and adapting the signal processing on the basis of the results. This enables the signal processing to be adapted on the basis of actual conditions of use in the field, either temporarily, or permanently.

Any of the preferred features may be combined with any of the aspects set out above as would be apparent to a skilled person.

Other advantages will be apparent to a skilled person, particularly in relation to any further prior art other than that discussed above.

BRIEF DESCRIPTION OF THE DRAWINGS

Embodiments of the invention will now be described in more detail by way of example, with reference to the accompanying drawings, in which.

DETAILED DESCRIPTION

Figure 1:
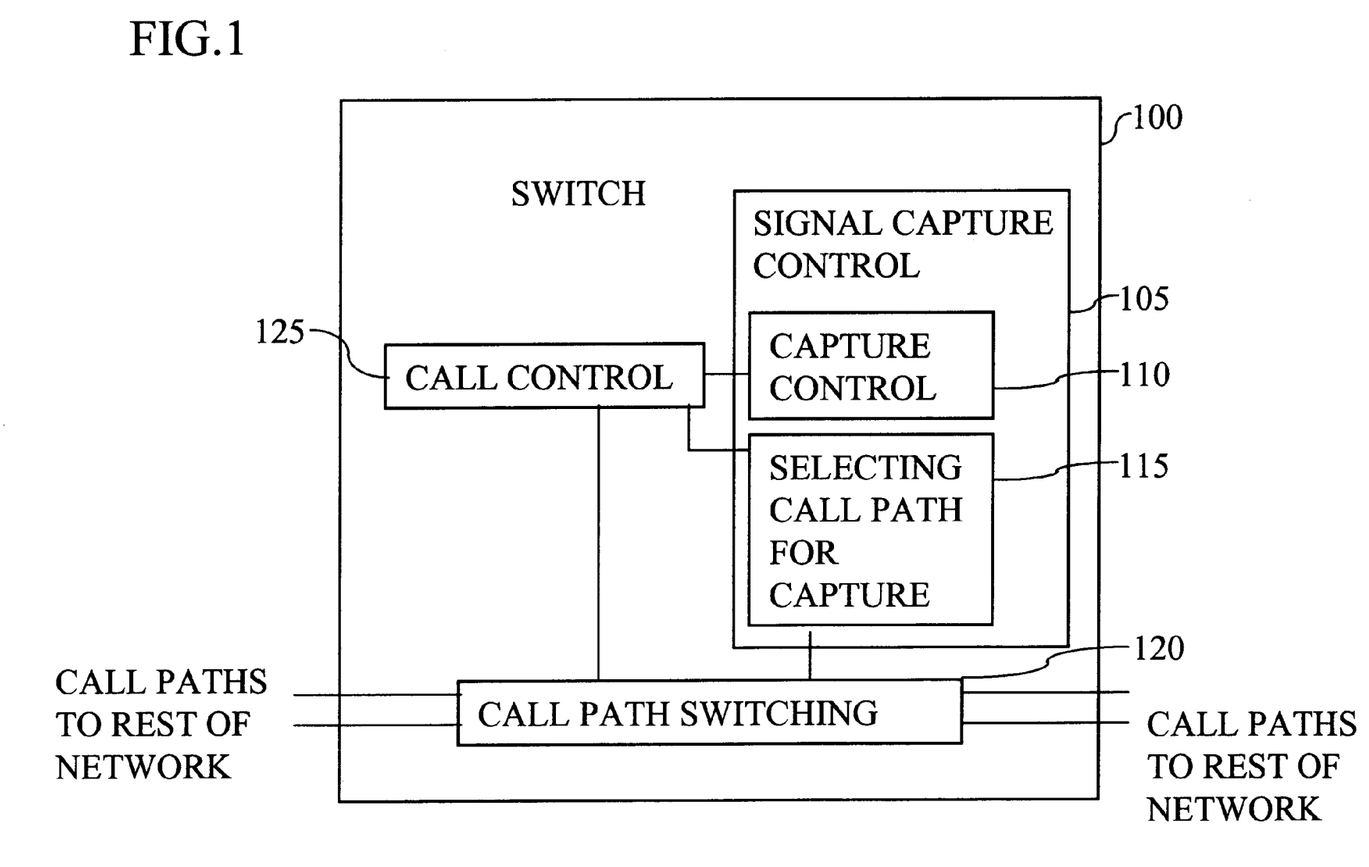
FIG. 1 shows a first embodiment of the invention in schematic form.

FIG. 1 shows in schematic form an embodiment of the invention at a high level. A switch 100 is part of a telecommunications network. It includes call control circuitry 125, signal capture control circuitry 120, and call path switching functions 120. The signal capture control circuitry includes capture control circuitry 110, and circuitry for selecting one or more of the call paths for capture. The capture control function communicates with the call control function. This may be to enable triggering to be made dependent on events in the call control function. Alternatively, or as well, the capture control function may make use of parts of the call control function, to carry out the capture. Optionally, the selecting function may communicate with the call control function. The selecting function and the call control function are shown coupled to the call path switching function. The switch may have other functions which are not illustrated for the sake of clarity. The illustrated control functions or circuitry may be implemented as software functions executed by conventional processing hardware, as would be apparent to a person skilled in the art.

The call control circuitry is for processing calls on many different call paths through the switch. The signal capture control circuitry is coupled to the call control circuitry to control the capture of a signal corresponding to a given one of the calls, for analysis. The actual separation and capture of the given call can be made internally in the switch if appropriate hardware is provided operating under control of the signal capture control. Alternatively, such hardware may be provided externally and fed with control signals, such as trigger signals, from the signal capture control function. The analysis of the captured call may also be made either internally in the switch, or externally, perhaps at a remote location.

Figure 2:
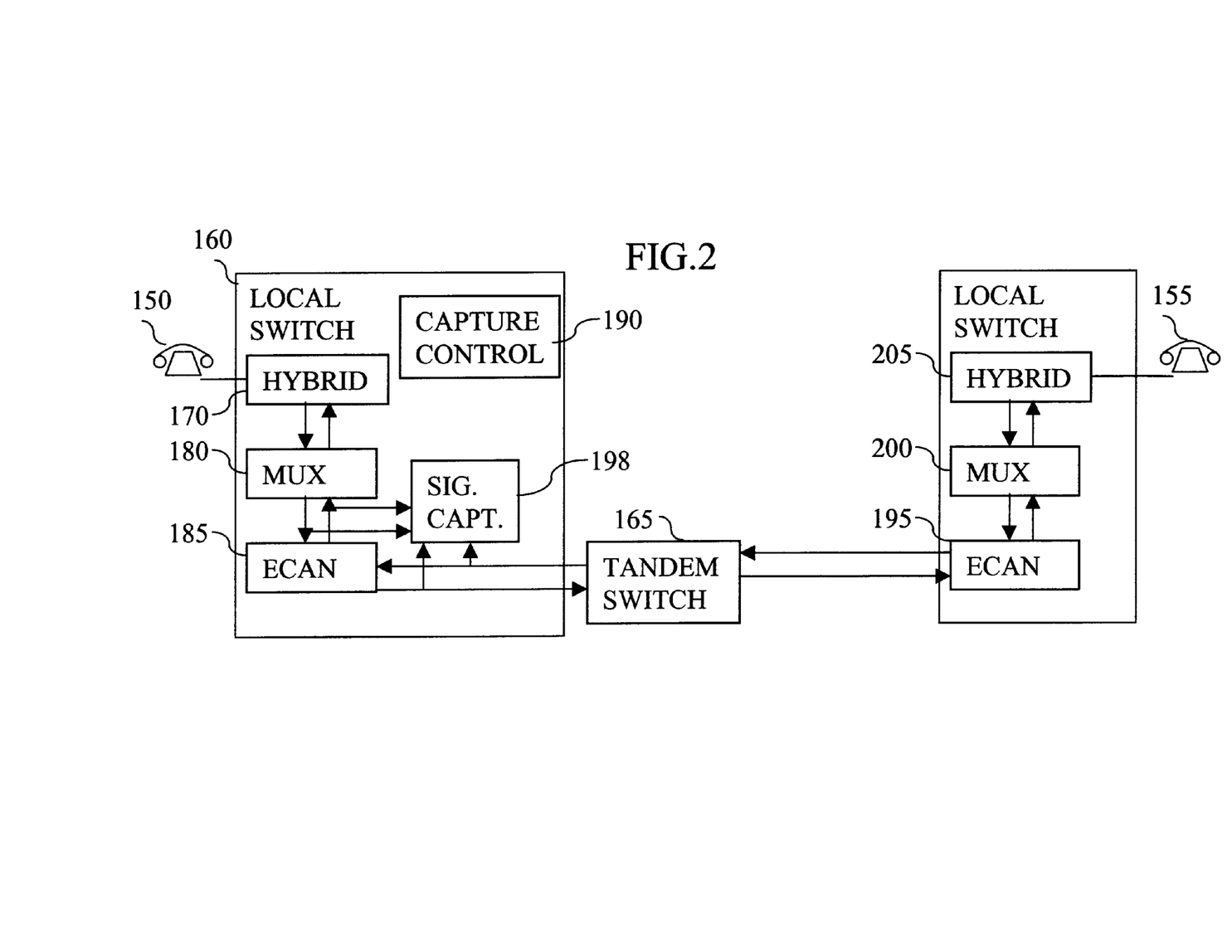
FIG. 2 shows an embodiment of the invention applied to capture of signals at an echo canceller, showing elements in a call path.

FIG. 2, Echo Canceller Example

FIG. 2 shows an example in which the signal capture controller is part of a local switch, and is arranged to be able to capture signals at an echo canceller in the local switch. The figure shows some of the elements in the call path from one subscriber's telephone 150, to another subscriber's telephone 155. The first subscriber telephone is connected to a first local switch 160, which routes the call to a tandem switch 165, and then to a second local switch 170, which is coupled to the second subscriber's telephone.

The first local switch includes a hybrid circuit 175, a multiplexer 180, and an echo canceller (ECAN) 185. The signal capture controller 190 is coupled to call control functions (not illustrated) in the local switch. There is on board hardware 198 for carrying out the actual signal capture. Connections are shown for this hardware to be coupled to the call path on both sides of the multiplexer and the echo canceller. This implies the capture hardware can capture four channels, that is two inputs to the canceller from each direction, and two outputs. Of these four channels, normally the most useful would be the two inputs to the canceller. Accordingly, if only two channels can be captured, these two would be favoured.

The function of the hybrid is to convert the two-wire signal from the subscriber line into a four-wire form, in which the voice signals in the two directions are separated. As there will be many subscriber lines connected to a single switch, the multiplexer is provided to enable any subscriber line to be coupled to the trunk to the neighbouring tandem switch, when a call is being set up.

The echo canceller 185 is needed because the hybrid, and other elements in the call path can introduce echoes which may be disturbing to the users of the telephone call, or may cause data errors if the call is being used to transmit data. An echo is caused by a reflection of a part of the signal, combined with a delay in the return of that reflection to the signal source. The delay is introduced mostly by the trunks between the switches, and in the subscriber lines. The hybrids are the major source of reflections.

The most effective location for echo cancellers is near the source of reflection, i.e., the hybrid. Accordingly, an echo canceller is shown close to each of the hybrids in the call path. In principle, the canceller could be implemented in analogue or digital circuitry, according to well-known design rules.

At the other end of the call path, at a second local switch, the call path goes through a corresponding chain of elements, an echo canceller 195, a multiplexer 200, and a hybrid 205, before the call path follows the subscriber line to the second telephone.

Echo cancellers may not succeed in cancelling all echoes. Performance problems may have a root cause that is internal or external. Internal causes can include digital signal processing algorithm weaknesses. These algorithms may be very complex, and there may be a weakness in particular environments, which can be addressed by improved algorithms. External causes may include excessive tail delay, non-linearities in the echo path, high near-end background noise, or voice levels not being at the same transmission level point (TLP).

If the cause of the problem is external, this will need to be established and proved to the customer (unless the cause is external to the canceller, but internal to the switch). If the problem is internal, to improve the algorithm, it will be necessary to repeat the problem and capture the stimulus which causes the problem. The echo canceller may include a monitor which sends out a message if it is not performing properly, regardless of whether the cause is internal or external. This message can be used as a trigger by the signal capture controller, to enable it to start a capture process (Post-Event Trigger). Another option would be to have continuous capture of a given call, with the trigger of the message causing the capture process to stop after a given delay (Pre-event Capture).

If an echo canceller is not performing well, a subscriber hears echo and may or may not call to complain. If the subscriber doesn't call only the subscriber knows of the problem. If the subscriber calls and complains, the Telco knows that there was a problem but not why (they will probably blame the echo canceller). The problem could have been caused by an echo path which exceeded the limits of the echo canceller (EC) design specification OR it could indicate a weakness in the EC algorithm design which should be addressed by a design team. In either case, it is important to determine the root cause, and the only way to definitely determine the root cause is to capture the stimulus PCM (pulse code modulation) signals (near-end and far-end) entering the EC at the time of the problem. Since normally with EC problems the system cannot know that there is a problem until it is happening, it must be assumed that the problem will continue a little while longer after being detected. This enables some of the conversation (and the echoes) which embodies the problem to be captured.

Capturing the signals entering the EC allows the designer to replay the event and study it by both listening and appropriate signal analysis techniques. If algorithm weakness is the root cause, then replaying the event allows the designer to examine the algorithms reaction to the stimulus and teach it new tricks (improve the algorithm). If the root cause was an echo path which exceeded the limits of the echo canceller then the switch supplier can respond to the switch operator with the exact reason for the failure.

Figure 3:
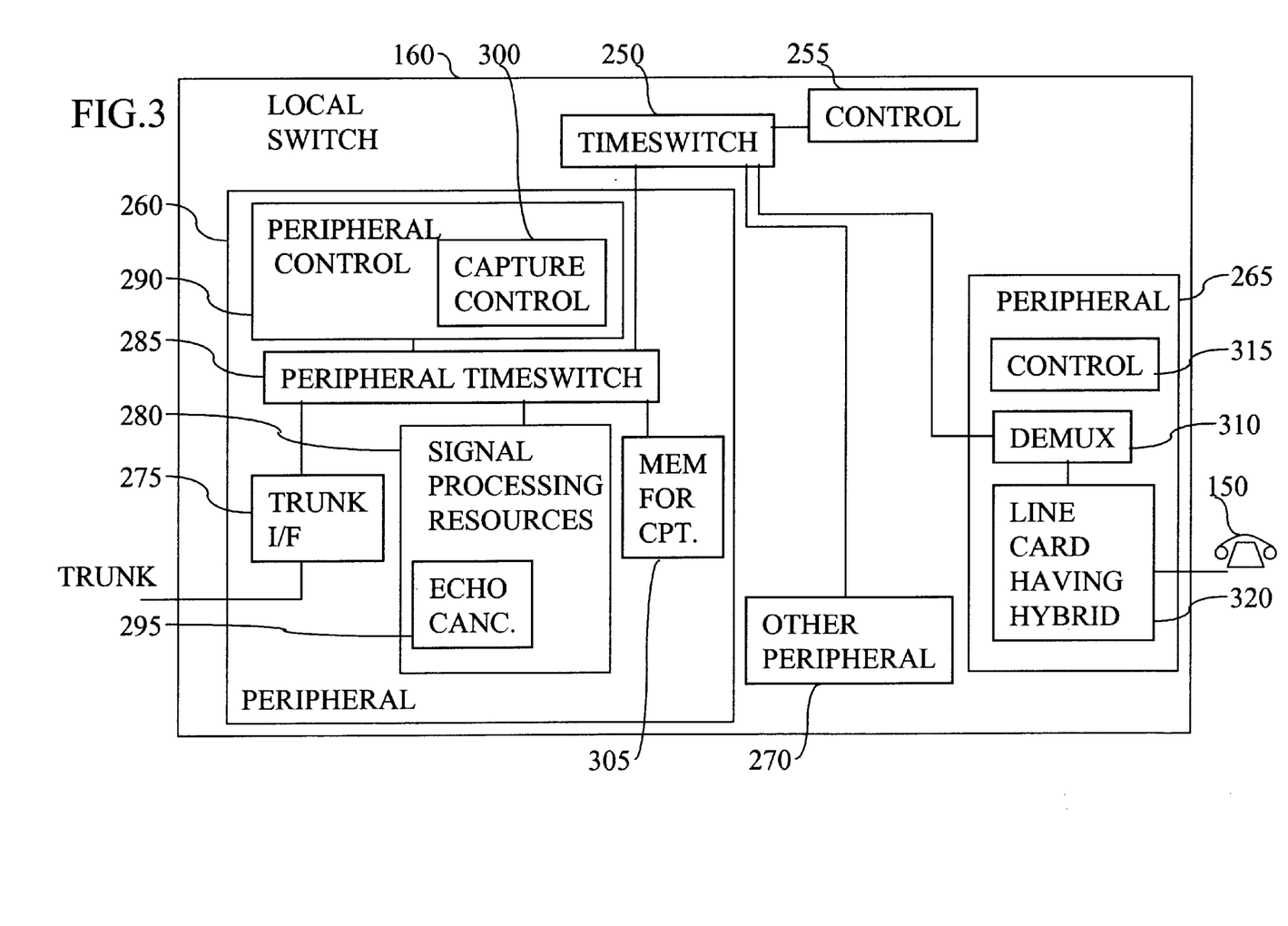
FIG. 3 shows a switch according to an embodiment of the invention.

FIG. 3, Local Switch

FIG. 3 shows some of the elements of a local switch including a signal capture control function. The switch of FIG. 3 may be used in the example shown in FIG. 2. The switch includes a number of peripherals for processing calls, coupled by a time switch 250. The time switch has a controller 255. A first peripheral 260 is for coupling a trunk. A second peripheral 265 is for coupling subscriber lines. Other peripherals 270 may be used to couple further trunks, or further subscriber lines. The peripheral 260 includes a trunk interface 275, and signal processing resources 280.

The signal processing resources and the trunk interface are coupled by a peripheral time switch 285, controlled by a peripheral controller 290. The signal processing resources may be implemented as digital signal processing modules, as will be described in more detail below. The signal processing functions may include echo cancellation, in which case the call path from the trunk will pass through the trunk interface, the peripheral time switch, to the ECAN function, then back through the peripheral time switch to the time switch 250. From there it would be routed to another peripheral as appropriate.

Also connected to the peripheral timeswitch is a memory 305 which can be used as a data recorder for signal capture. Such memory could be implemented as part of the signal processing resources. In this case the PCM signal from the peripheral timeswitch could be routed to a digital signal processor or similar hardware, which could be arranged to pass the signal to its own memory, or a shared memory. It could be arranged to carry out processing before storage, such as compression, or removal of periods of the signal when no speech is detected, as appropriate.

A capture control function 300 is illustrated as part of the peripheral control function. An example of how this might be implemented to control the timeswitch to select the appropriate call path and copy it, i.e. broadcast it to the capture memory, will be explained below with reference to FIGS. 4 to 6. This may be used to capture the call signal as it enters echo cancellation, and/or as it leaves echo cancellation, or even at some intermediate processing point in the echo cancellation algorithms. As the call path includes signals in two directions, for the echo cancellation example, the signal capture functions should be able to record two signals simultaneously, to capture both the input signals to the echo canceller from both directions of the call. Even better would be four channel recording, to capture precisely the two inputs and two outputs of the echo canceller for that call.

Figure 4:
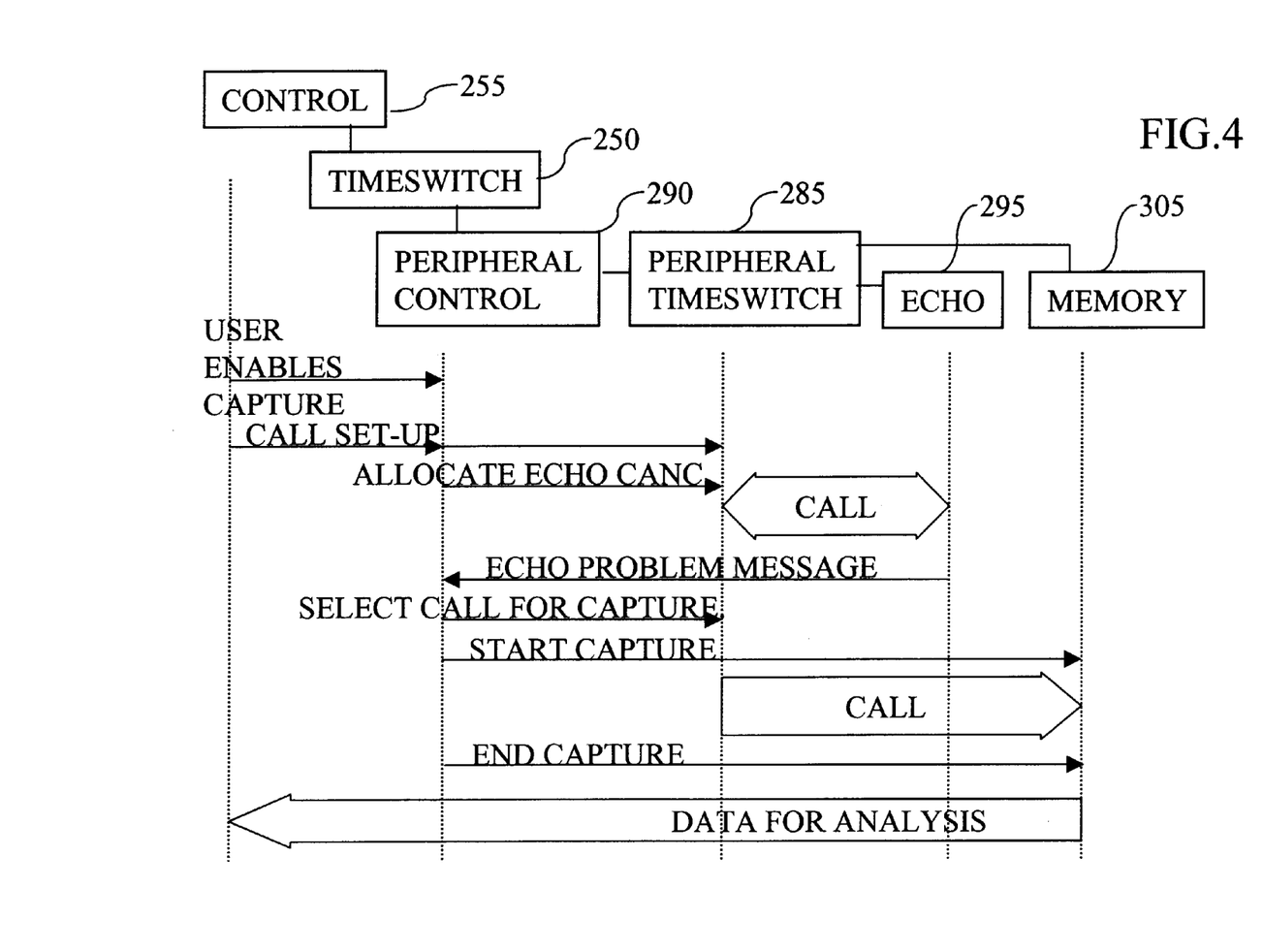
FIG. 4 shows a sequence chart of operations of some of the elements of FIG. 3.

FIG. 4, Operation of the Local Switch of FIG. 3

FIG. 4 shows some of the principal steps in the operation of the local switch to capture signals. First, the user enables the capture. The user in this case may be a maintenance or operations engineer of the telephone company operating the switch. Through operations and administration channels in the network, the capture operation can be enabled remotely, via the control function 255, and the peripheral control 290. The call is then set up using conventional call signaling, and preferably using exactly the same call path as the path which showed the echo problem. More often, a problem is reported and there is no way of knowing which trunk or echo canceller is causing the problem. In this case monitoring would be enabled for all cancellers. The next fault will trigger capture of the signal at the echo canceller experiencing the problem.

The peripheral control function 290 allocates an ECAN resource to the call. The call will then be switched by the peripheral time switch, under control of the peripheral control, from the trunk interface, or from the time switch 250, to the ECAN. The ECAN should recognize that the echo cancellation is not performing properly, and it will send a fault message to the peripheral control function.

This message is used as a trigger to start capture of the appropriate signals. The peripheral timeswitch will extract the call and pass it on a signal capture output, to the capture memory. Alternatively the resulting capture signal could be sent elsewhere in the local switch for storage, or even sent externally to the local switch. The peripheral control will end the capture operation as appropriate, and the stored captured signal can be transmitted to the user for analysis.

These steps will be explained in more detail in relation to FIGS. 5 and 6. An alternative to triggering on a fault message such as that from the echo canceller would be to trigger manually, in which case the peripheral control would wait for the user to send an appropriate message. Another alternative is pre-capture. In this case the capture is started manually, and when the end of the capture memory is reached, the capture memory goes back and overwrites itself. Upon a trigger, or manual input from the user, capture is stopped, and the memory holds the signal for a given period before the trigger. Of course if stopping the capture is delayed after the trigger, then the memory may hold the signal as it was for some length of time before and after the trigger.

An alternative to capturing input to an echo canceller is capturing a signal as input to a DTMF receiver. In this case the trigger could be the receiver indicating it has received a digit at an unusual time, e.g. during speech. Another trigger might be an event such as a call processing timeout if the receiver has not indicated it detected a digit when the call controller was waiting for one. Another example of a trigger might be a combination of a call processing event and an event detected from the signal on the call path. If a call was broadcast to a digital signal processor (DSP) to detect DTMF tones, a trigger could occur when the DSP detection is inconsistent with the DTMF receiver indication received by the call controller.

Figure 5:
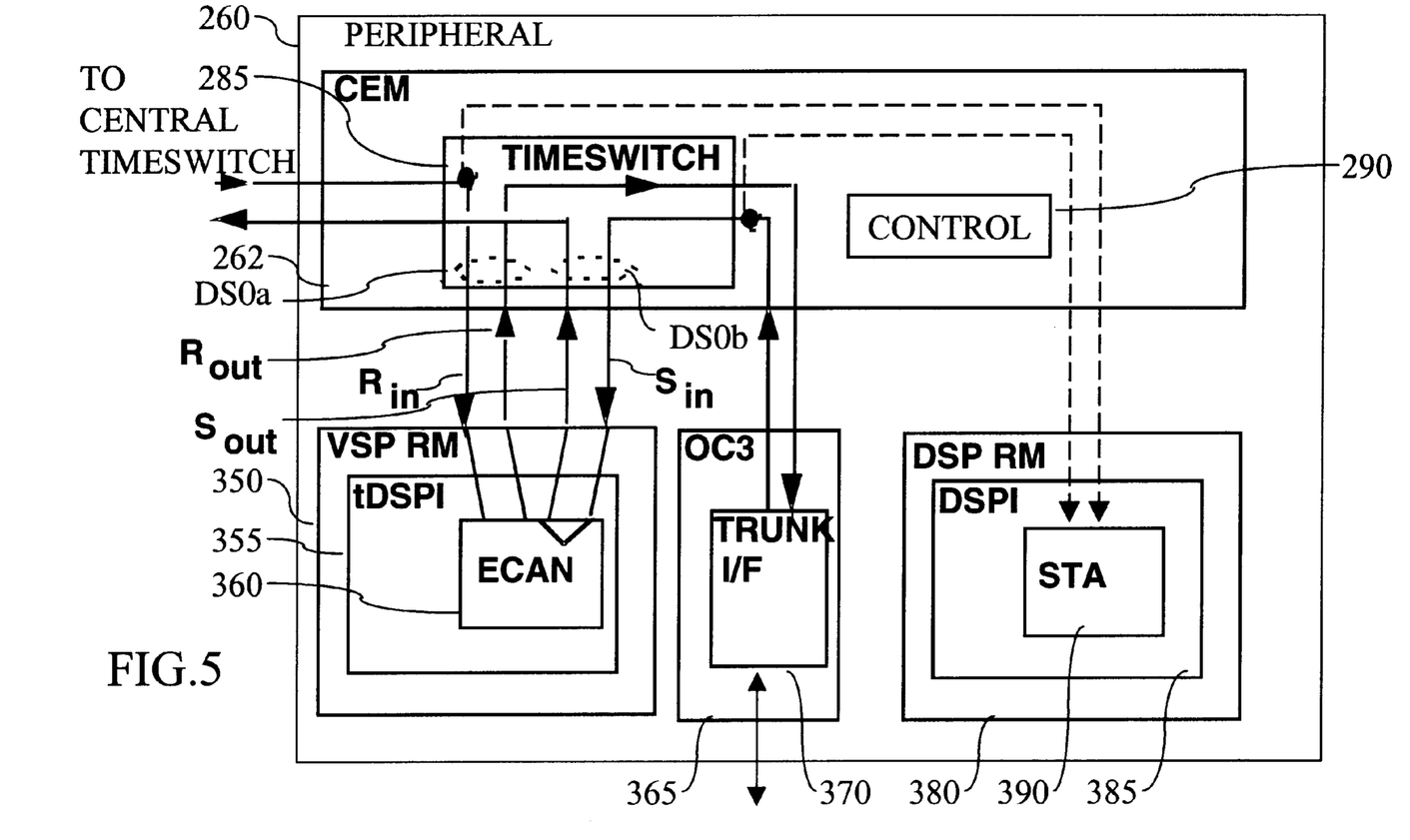
FIG. 5 shows another embodiment having some of the elements of FIG. 4, and showing call paths during capture.

FIG. 5, Configuration with Timeswitch Paths During Capture

FIG. 5 shows an example of the peripheral of FIG. 3. A CEM (Common Equipment Module) 262 includes a peripheral time switch 285, and control functions 290. The control functions could be implemented as software tasks running on conventional processor hardware. The timeswitch is used to interconnect a number of call path interfaces, and a number of call path signal processing elements. One such signal processing element is the echo canceller (ECAN) 360. This may be implemented as a software module running on a digital signal processor sl and (tDSPI) 355, made up of an array of processors and associated hardware such as memory. Each such array may be able to execute echo cancellation on multiple calls simultaneously. The array as illustrated is part of a VSPRM (Voice Signal Processing Resource Module) 350, which may comprise multiple digital signal processing islands. A trunk interface 370 is shown as part of an OC3 interface 350, coupled to the timeswitch 285.

Also connected to the timeswitch is a DSPRM (Digital Signal Processor Resource Module) 380. This contains a DSPI 385 (Digital Signal Processor Island). This runs a software application called STA 390 (Services Test Application). The STA may include various tools that can be interconnected in any configuration. For example, it may have a data recorder, a signal processor for the captured signal, and a signal generator for generating test signals to insert into call paths. These test signals can include sinusoids and noise signals.

FIG. 5 shows a call path through the peripheral from the central timeswitch 250 shown in FIG. 3, to a trunk external to the switch, via trunk interface 370. The call path is fed through the echo canceller 360, and two channel capture is shown. The two channels captured are the two input signals to the echo canceller from either direction of the call path.

The peripheral timeswitch 285 is used to route the call from the central timeswitch 250 to the DSPRM. This signal is labelled $R_{in}$. It is fed to the appropriate TDSPI, and then to the appropriate echo canceller. It is in the form of a digital PCM stream. The signal is output from the echo canceller as $R_{out}$, and is fed back to the timeswitch, which routes it onto the appropriate trunk interface 370. The pair of signals making up the call path in this direction are labelled DSOa. Correspondingly, the pair of signals in the other direction are labelled DSOb. Of this pair, one is routed by the timeswitch into the echo canceller ($S_{in}$). The other, $S_{out}$, is output by the echo canceller to the timeswitch, and routed by the timeswitch 285 onto the central timeswitch 250 of this switch.

The timeswitch is arranged to broadcast signal $R_{in}$, and signal $S_{in}$ to the signal capture data recorder STA.

Figure 6:
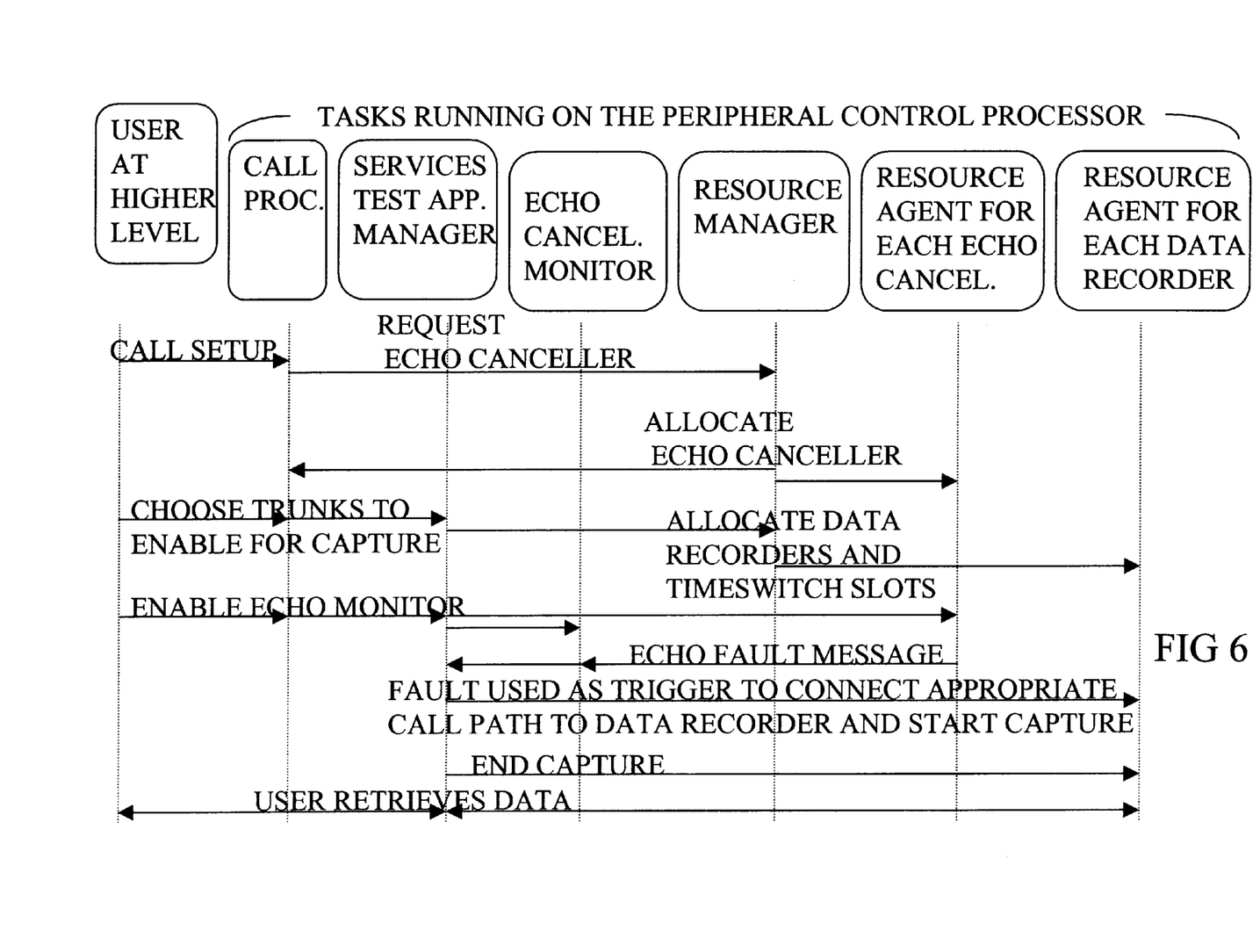
FIG. 6 shows a sequence chart of some of the operations of tasks running on the control processor shown in FIG. 5.

FIG. 6, Sequence Chart of Peripheral Control Processor Tasks

FIG. 6 shows a sequence chart of an example of tasks running on the peripheral control processor to achieve the signal capture shown in more general terms in FIG. 4. Six tasks are shown, together with a representation of a user at a higher level. This user may be an application running at a higher level in the switch, such as the central control shown in FIG. 3. Alternatively, it could be embodied by a designer or craftsperson who has logged in to an application such as a switch management program, to control signal capture.

The six tasks illustrated are (1) a call processing task, for processing calls, usually one task for each call (2) a services test application manager, (3) an echo cancellation monitor, (4) a peripheral resource manager, (5) a resource agent for each echo canceller, and (6) a resource agent for each data recorder. The resource agents act primarily to communicate with resources that are not actually running on the CEM, such as the VSPRM and the DSPRM shown in FIG. 5.

As shown in FIG. 6, the user initiates a call set up. The call processor acts to control the call. One of the set-up actions is to make the connections to an echo canceller as shown in FIG. 5. The call processor would pass a request for an echo canceller to the resource manager. The resource manager would allocate one of the echo cancellers to this call. It would inform the appropriate resource agent for the echo canceller, and the call processor that issued the request. Next, a user would need to enable the trunks for signal capture. The services test application manager would pass this again to the resource manager. The resource manager would allocate the necessary number of data recorders and provide time switch slots as appropriate. This could involve communicating with the resource agent for the relevant data recorder.

The user may also need to enable the echo monitor on the echo canceller. This might normally be switched off. Once enabled, the echo canceller monitor awaits an echo fault message. This would be passed by the resource agent for the echo canceller, to the echo canceller monitor. The echo canceller monitor would pass it on to the services test application manager. If it corresponds to a call path which has been enabled for capture, then the services test application manager will use the fault message as a trigger to start capture. The services test application manager will cause the timeswitch to start broadcasting the call to the data recorder within the STA, if this is not happening continuously. The services test application manager will also start the capture by the STA, by communicating with the resource agent for the allocated data recorder.

According to the application, or optionally, according to user input, the services test application manager will control ending of the capture, using the resource agent for the allocated data recorder. Finally, the user may retrieve the captured data from the data recorder, or may analyse it remotely. The services test application manager would again be used to manage the retrieval.

The echo cancellation, or other digital signal processing function, may be adapted automatically according to the result of analysis of the captured data. Some analysis of the captured data could be carried out automatically, and could be carried out either locally in the switch, or remotely.

If appropriate, multiple excerpts of signals of carrying at different events, or for different calls, could be recorded serially in the data recorder, before retrieval.

For echo cancellation analysis, it may be appropriate to capture ten or fifteen seconds of the signal.

The signal being captured may be in the form of 8 KHz PCM streams.

It would be possible to arrange the peripheral control processor tasks so that a resource agent for the echo canceller carries out the functions of the service test application manager. The resource agent could be arranged to request information on the call from the call processor, including external context ID information. This information and the timeswitch slot of the relevant echo canceller could be used to ensure the peripheral timeswitch broadcasts the correct call to the data recorder.

The captured block of PCM data may be packaged with all other information about the call available to the switch and the data contained in the SOS message. This should result in a file which can easily be accessed (via ftp) by the designer to determine the root cause of the problem.

Other Examples, Variations

Although the described embodiments relate to an echo canceller, the invention can be applied equally to other types of signal processor such as MF (multi-frequency) or DTMF (discrete tone multi-frequency) digit detectors, speech recognition processors, speech coders, equalisers, and conference call mixers.

Although the described embodiments use conventional telephony, the invention is equally applicable to IP (Internet Protocol) telephony, e.g. at a switch which acts as a gateway for passing calls between PSTN and IP networks.

Although the embodiments describe manual analysis of the captured data, in appropriate cases this could of course be automated. For example, noise parameters and voice levels could be automatically calculated from the signal data. Furthermore, in appropriate cases, the signal processing could be automatically adjusted according to the results of the analysis, for example to adapt the signal processing algorithm to suit the actual noise characteristics at the input.

Other variations of the described embodiments, and other applications of the invention can be conceived and are intended to be within the scope of the claims.

What is claimed is:

1. Signal capture control apparatus for use integrated in a switch for a telecommunications network, the switch comprising a plurality of call paths, and call control circuitry for controlling a plurality of calls on the call paths through the switch, the apparatus comprising:
   selecting circuitry for selecting at least one of the call paths corresponding to a given one of the calls, for signal capture for analysis, and
   capture control circuitry for controlling the signal capture on the selected call path and for communicating with the call control circuitry.

2. The apparatus of claim 1, the switch comprising signal processing circuitry for processing the signal, and the capture control circuitry being arranged to capture the signal before, after or during the signal processing.

3. The apparatus of claim 1, the given call being multiplexed with others of the calls, and the selecting circuitry comprising circuitry for controlling demultiplexing of the given call.

4. The apparatus of claim 1, the capture control circuitry comprising circuitry for generating a capture trigger signal.

5. The apparatus of claim 4, the capture trigger being generated on the basis of an event in the call control circuitry.

6. The apparatus of claim 4, the capture trigger being generated on the basis of a signal on a call path.

7. The apparatus of claim 1, arranged to store the captured signal in the switch.

8. The apparatus of claim 1 comprising circuitry for sending the captured signal to a remote location for analysis.

9. The apparatus of claim 1 comprising circuitry for processing the captured signal before storage.

10. The apparatus of claim 1 comprising circuitry arranged to receive an indication of a fault in the telecommunications network, and to carry out the signal capture according to the fault indication.

11. The apparatus of claim 10, the switch comprising signal processing circuitry and the apparatus being arranged to receive the fault indication from the signal processing circuitry.

12. A switch for a telecommunications network comprising:
   a plurality of call paths,
   call control circuitry for controlling a plurality of calls on the call paths through the switch, the apparatus comprising:
      selecting circuitry for selecting at least one of the call paths corresponding to a given one of the calls, for signal capture for analysis, and
      capture control circuitry for controlling the signal capture on the selected call path and for communicating with the call control circuitry.

13. The switch of claim 12 further comprising signal processing apparatus, and circuitry for receiving results from an analysis of the captured signals and adapting the signal processing on the basis of the results.

14. A method of using signal capture apparatus in a switch for a telecommunication network, the switch comprising a plurality of call paths, and call control circuitry for controlling a plurality of calls on the call paths through the switch, the method comprising the steps of:
   selecting at least one of the call paths corresponding to a given one of the calls, for signal capture for analysis, and
   controlling the signal capture on the selected call path, the control involving communicating with the call control circuitry.

15. Software on a computer readable medium for carrying out the method of claim 14.

* * * * *